US008888185B2

(12) United States Patent
Liao

(10) Patent No.: US 8,888,185 B2
(45) Date of Patent: Nov. 18, 2014

(54) MOTION PLATFORM HAVING DECOUPLED TWO AXES

(71) Applicant: INJOY Motion Corp., New Taipei (TW)

(72) Inventor: Chung-Shu Liao, New Taipei (TW)

(73) Assignee: INJOY Motion Corp., New Taipei (TW)

( * ) Notice: Subject to any disclaimer, the term of this patent is extended or adjusted under 35 U.S.C. 154(b) by 75 days.

(21) Appl. No.: 13/684,296

(22) Filed: Nov. 23, 2012

(65) Prior Publication Data

US 2013/0292981 A1 Nov. 7, 2013

(30) Foreign Application Priority Data

May 7, 2012 (TW) .................................. 101208556

(51) Int. Cl.
| | | |
|---|---|---|
| A47G 29/00 | (2006.01) |
| A47C 1/00 | (2006.01) |
| A47C 1/12 | (2006.01) |
| F16M 11/20 | (2006.01) |
| A63J 5/00 | (2006.01) |
| A47C 15/00 | (2006.01) |
| A63J 25/00 | (2009.01) |
| A47C 7/00 | (2006.01) |
| A47C 3/02 | (2006.01) |

(52) U.S. Cl.
CPC ... *A47C 1/00* (2013.01); *A47C 1/12* (2013.01); *F16M 11/2035* (2013.01); *A63J 5/00* (2013.01); *A47C 15/004* (2013.01); *A47C 7/002* (2013.01); *A63J 25/00* (2013.01); *A63J 2005/002* (2013.01); *A47C 3/02* (2013.01)
USPC .................................. 297/344.11; 248/346.03

(58) Field of Classification Search
CPC ....................................................... A63G 31/16
USPC ............... 297/344.1, 344.11, 344.12, 344.16; 248/157, 346.03, 357, 669
See application file for complete search history.

(56) References Cited

U.S. PATENT DOCUMENTS

| | | | | |
|---|---|---|---|---|
| 3,983,640 A | * | 10/1976 | Cardullo et al. ...... 297/DIG. 3 X |
| 4,967,994 A | * | 11/1990 | Rice .............................. 248/669 |
| 5,009,412 A | * | 4/1991 | Roodenburg et al. ........... 472/59 |
| 5,022,708 A | * | 6/1991 | Nordella et al. ............... 297/327 |
| 5,642,302 A | * | 6/1997 | Dumont et al. ....... 297/DIG. 4 X |
| 5,662,523 A | * | 9/1997 | Yasumaru et al. .......... 472/60 X |
| 5,711,670 A | * | 1/1998 | Barr ............................ 472/60 X |
| 5,765,840 A | * | 6/1998 | Tame ............................ 297/330 |
| 5,901,612 A | * | 5/1999 | Letovsky .................. 297/314 X |
| 5,930,152 A | * | 7/1999 | Dumont et al. ....... 297/DIG. 4 X |
| 5,971,348 A | * | 10/1999 | Thomas ..................... 248/669 X |
| 6,053,576 A | * | 4/2000 | Jessee .................. 297/344.16 X |
| 6,095,926 A | * | 8/2000 | Hettema et al. ................. 472/59 |
| 7,094,157 B2 | * | 8/2006 | Fromyer et al. ................ 472/59 |
| 7,611,204 B2 | * | 11/2009 | Reed et al. ..................... 297/362 |

(Continued)

*Primary Examiner* — Rodney B White
(74) *Attorney, Agent, or Firm* — Merchant & Gould P.C.

(57) ABSTRACT

A motion platform having decoupled two axes adopts four modularized pneumatic bellows configured in an orthogonal arrangement. The pneumatic bellows can be independently controlled to cause the motion platform to be operated in one rotational degree of freedom with a frontward-and-backward swinging or a leftward-and-rightward swinging; or the pneumatic bellows can be synchronously controlled to cause the motion platform operated in two rotational degrees of freedom without being interfered with each other. Thus, the motion platform of the present disclosure is characterized with advantages of simplified mechanism, fewer components, convenient maintenance and reduced cost.

10 Claims, 5 Drawing Sheets

(56) References Cited

U.S. PATENT DOCUMENTS

| | | | |
|---|---|---|---|
| 7,918,505 B2* | 4/2011 | Raphael et al. | 297/260.2 |
| 7,934,773 B2* | 5/2011 | Boulais et al. | 297/344.15 X |
| 8,251,452 B2* | 8/2012 | Hill | 297/380 |
| 8,523,214 B2* | 9/2013 | Johansson et al. | 297/258.1 X |
| 8,585,142 B2* | 11/2013 | Jamele et al. | 297/232 |
| 8,641,140 B2* | 2/2014 | Swierczewski | 297/216.15 |
| 8,657,376 B2* | 2/2014 | Gagnon et al. | 297/344.11 X |
| 8,662,585 B2* | 3/2014 | Garvis et al. | 297/314 |
| 2006/0261647 A1* | 11/2006 | Maas et al. | 297/216.1 |
| 2007/0063557 A1* | 3/2007 | Sawdy | 297/257 |
| 2007/0262628 A1* | 11/2007 | Perigny | 297/284.4 |
| 2008/0054561 A1* | 3/2008 | Canterbury et al. | 297/217.3 X |
| 2009/0206642 A1* | 8/2009 | Raphael et al. | 297/217.3 |
| 2010/0090507 A1* | 4/2010 | Boulais et al. | 297/217.3 |
| 2011/0062755 A1* | 3/2011 | Gil et al. | 297/311 X |
| 2011/0115262 A1* | 5/2011 | Hill | 297/217.1 X |
| 2012/0019030 A1* | 1/2012 | Manard et al. | 297/217.3 |
| 2012/0216347 A1* | 8/2012 | Tundo et al. | 297/260.1 X |
| 2012/0286550 A1* | 11/2012 | Gil et al. | 297/311 X |
| 2013/0001995 A1* | 1/2013 | Garvis et al. | 297/314 |

* cited by examiner

MOTION PLATFORM HAVING DECOUPLED TWO AXES

RELATED APPLICATIONS

This application claims priority to Taiwan Application Serial Number 101208556, filed May 7, 2012, which is herein incorporated by reference.

BACKGROUND

1. Technical Field

The present disclosure relates to a motion platform having decoupled two axes, and more particularly to a motion platform having decoupled two axes by pneumatic bellows.

2. Description of Related Art

According to the terminology in Spatial Mechanism, the definition of "decoupling mechanism" refers to two axes of a two-axis motion mechanism capable of being independently operated and not interfered with each other.

A traditional two-axis dynamic simulation device, for example, a motion platform served for scenarios of motion games such as flight simulations, car racing, boat racing, motorcycle matches and tank fighting etc., is a kind of a two-axis motion mechanism satisfying the definition of the decoupling mechanism. The motion platform can be operated to rotate in a single-axis motion or a synchronous two-axis motion by hydraulic pumps or drive motors.

However, the two-axis dynamic simulation device installed with the hydraulic pumps is disadvantageous in that the two-axis dynamic simulation device is quite large in size, and of many components, so as to need frequent maintenance has difficulty in assembly and repair. Similarly, the two-axis dynamic simulation device installed with the drive motors is disadvantageous in that the two-axis dynamic simulation device is installed with too many components to be conveniently assembled.

Thus, in view of costs and efficiency, neither the two-axis dynamic simulation device installed with the hydraulic pumps nor the two-axis dynamic simulation device installed with the drive motors is economic and practical in use.

Referring to FIG. 1, a conventional pneumatic-bellow typed motion platform 10 includes a base chassis 11 and a movable frame 12 in which the base chassis 11 is provided with pneumatic bellows 13 at four corners thereof, respectively. The movable frame 12 is stacked on the base chassis 11 in which four corners of the movable frame 12 respectively press on the pneumatic bellows 13.

However, due to the arrangement of the pneumatic bellows 13, these four pneumatic bellows 13 may affect with each other in operation. When only controlling one or three of the pneumatic bellows 13 to inflate or shrink, the movable frame 12 cannot be rotated. On the contrary, when only controlling two neighboring pneumatic bellows 13 to inflate or shrink, the movable frame 12 can be rotated in one degree of freedom of one-axis rotation around an X axis or a Y axis shown in FIG. 1, but the movable frame 12 still cannot be rotated in two degrees of freedom of two-axis rotation around both the X axis and the Y axis.

Therefore, even through the conventional pneumatic-bellow typed motion platform 10 is considered as a two-axis dynamic simulation device, the pneumatic-bellow typed motion platform 10 is a two-axis dynamic simulation device without the aforementioned decoupling mechanism.

SUMMARY

In view of that, one aspect of the present disclosure is to provide a motion platform having decoupled two axes which adopts four modularized pneumatic bellows configured in an orthogonal arrangement. Thus, the motion platform having decoupled two axes rotated in two rotational degrees of freedom can act as a decoupling mechanism of the two-axis motion which independently controls both of the two rotational degrees of freedom, thus, while the two rotational degrees of freedom are rotated, the two rotational degrees of freedom will not be interfered or influenced mutually. Therefore, the present disclosure has advantages of simplification of structural design, reduction of essential components, convenience of maintenance, and decreasing of manufacturing cost.

The motion platform having decoupled two axes includes a base chassis, a movable frame and four first pneumatically-driven elements. The base chassis is configured to be disposed on a ground. The first pneumatically-driven elements are securely sandwiched between the base chassis and the movable frame, and are mutually in an orthogonal arrangement such that the movable frame is capable of rotating in two rotational degrees of freedom.

A further improvement of the motion platform having decoupled two axes is that the first pneumatically-driven elements can be pneumatic bellows, pneumatic cylinders or pneumatic cushions.

A further improvement of the motion platform having decoupled two axes is that each of the four corners of a bottom surface of the base chassis can be arranged with a height-adjustment stand A further improvement of the motion platform having decoupled two axes is to arrange a seat assembly on a top surface of the movable frame. The seat assembly comprises a swinging frame and a second pneumatically-driven element. The swinging frame is assembled to the movable frame to be a hinge assembly. The second pneumatically-driven element is independently installed relative to the first pneumatically-driven elements, and is disposed between the top surface of the movable frame and the swinging frame, so that the swinging frame can be rotated in one rotational degree of freedom.

A further improvement of the motion platform having decoupled two axes is that the second pneumatically-driven element can be a pneumatic bellow, a pneumatic cylinder or a pneumatic cushion.

A further improvement of the motion platform having decoupled two axes is to arrange one audience seat on a top surface of the swinging frame.

The motion platform having decoupled two axes of the present disclosure can be a motion platform applied to motion games, motion theaters and related virtual reality activities.

BRIEF DESCRIPTION OF THE DRAWINGS

The present disclosure will be apparent to those ordinarily skilled in the art by reading the following detailed description of a preferred embodiment thereof, with reference to the attached drawings, in which.

DESCRIPTION OF THE EMBODIMENTS

Figure 1:
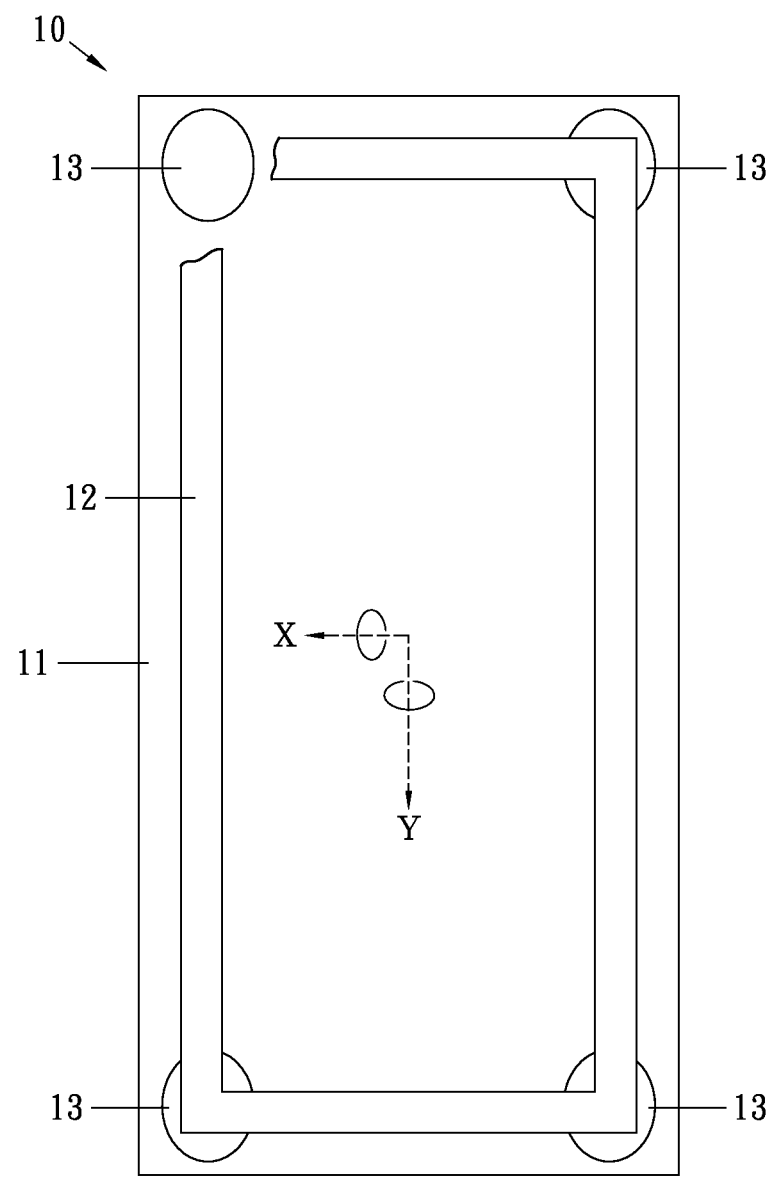
FIG. 1 is a schematic view of a conventional pneumatic-bellow typed motion platform.
Figure 2:
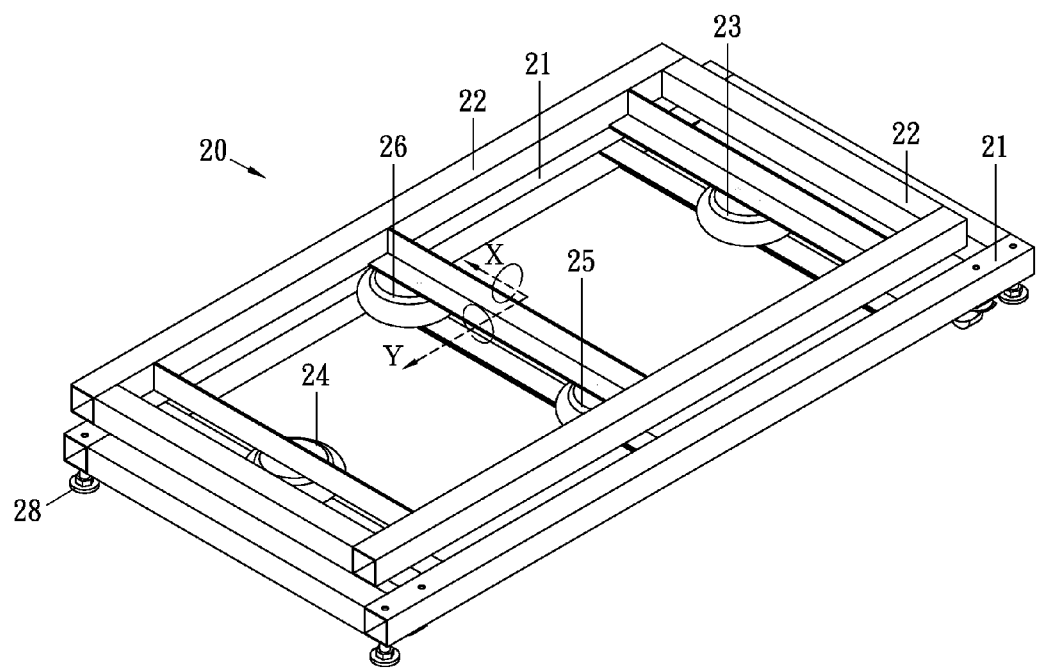
FIG. 2 is a perspective view of a motion platform having decoupled two axes according to one embodiment of the present disclosure.
Figure 3:
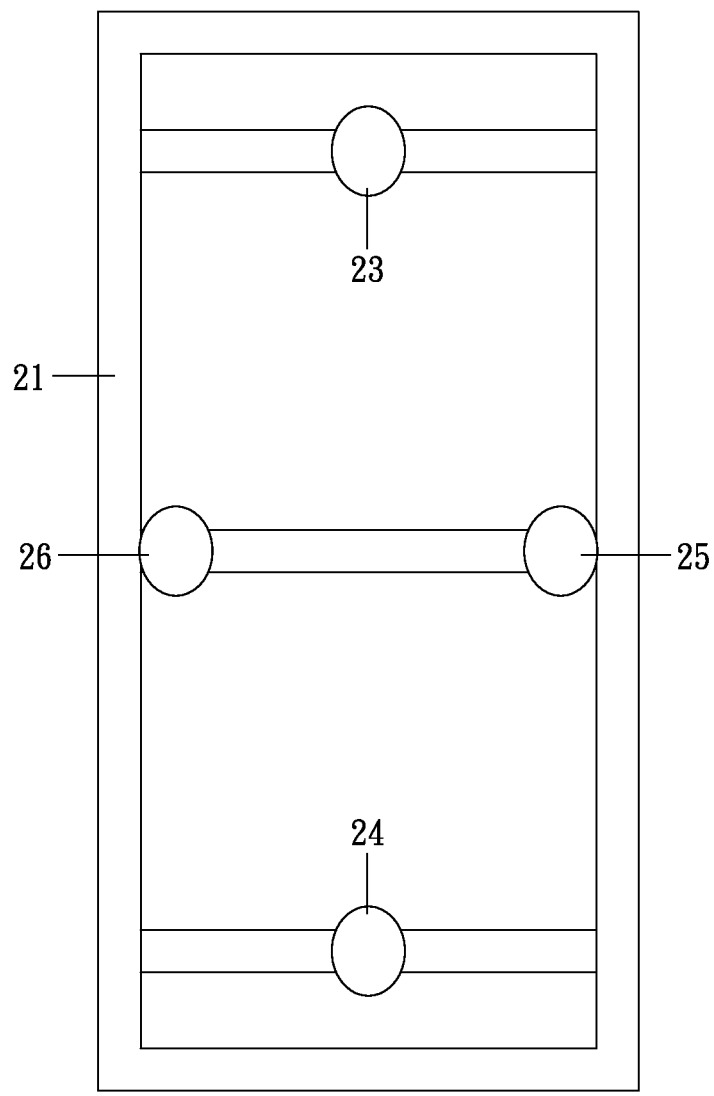
FIG. 3 is a schematic view of the four pneumatic bellows of the motion platform having decoupled two axes in FIG. 2 being configured in an orthogonal arrangement.

Reference is now made to FIG. 2 and FIG. 3. The motion platform 20 of the present disclosure includes a base chassis 21, a movable frame 22 and four first pneumatically-driven elements (e.g., pneumatic bellows 23, 24, 25, 26 in FIG. 2).

Specifically, the base chassis 21 is made of a framework with firm and rigid properties, placed on a base ground, and has a top surface and a bottom surface which are oppositely arranged with each other, and the top surface of the base chassis 21 is opposite to the base ground. The pneumatic bellows 23, 24, 25, 26 are in an orthogonal arrangement, and securely configured on the top surface of the base chassis 21. Furthermore, four height-adjustment stands 28 are respectively disposed on four corners of the bottom surface of the base chassis 21 for adjusting the level height of the base chassis 21 from the ground base.

The movable frame 22 is made of a framework with firm and rigid properties, and placed on the top of the pneumatic bellows 23, 24, 25, 26; in other words, the pneumatic bellows 23, 24, 25, 26 are securely sandwiched between the base chassis 21 and the movable frame 22, such that the movable frame 22 can be rotated in two rotational degrees of freedom.

The four pneumatic bellows 23, 24, 25, 26 are modularized pneumatic bellows with the same structural design, and each of the four pneumatic bellows 23, 24, 25, 26 is connected to one gas compressor (not shown in Figures) via a respective pipeline having a pressure valve thereon, and the different pressure valves on the pipelines can be independently controlled as switches to aerate or exhaust gas for increasing or decreasing gas-pressure in the four pneumatic bellows 23, 24, 25, 26 by computer software programs. When one of the pressure valves is controlled to aerate gas, the gas compressor supplies gas to the respective pneumatic bellow 23, 24, 25 or 26, so that the respective pneumatic bellows 23, 24, 25 or 26 inflates; otherwise, when one of the pressure valves is controlled to exhaust gas, the gas is discharged from the respective pneumatic bellow 23, 24, 25 or 26, so that the respective pneumatic bellow 23, 24, 25 or 26 shrinks through the respective pressure valves.

It is noted that when the pneumatic bellows 23, 24, 25, 26 are in the orthogonal arrangement, one imagined linear line linking two of the pneumatic bellows 23 and 24 (referring to a Y axis shown in FIG. 2) is orthogonal to another imagined linear line linking the other two of the pneumatic bellows 25 and 26 (referring to an X axis shown in FIG. 2). Namely, the pneumatic bellows 23, 24, 25, 26 are respectively located at the middle of each side of the top surface of the base chassis 21. Thus, when the two pneumatic bellows 23, 24 are operated, the two pneumatic bellows 23, 24 can provide the movable frame 22 to rotate in one rotational degree of freedom with a frontward-and-backward swinging around the X axis shown in FIG. 2, and when the other two pneumatic bellows 25, 26 are operated, the two pneumatic bellows 25, 26 can provide the movable frame 22 to rotate in another one rotational degree of freedom with a leftward-and-rightward swinging around the Y axis shown in FIG. 2.

Since the pneumatic bellows 23, 24, 25, 26 are orthogonally arranged, the decoupling mechanism of the two-axis motion that can independently control both of the two rotational degrees of freedom is satisfied in the present disclosure.

When the movable frame 22 is operated in the two-axis movements, and one, two or three of the pneumatic bellows 23, 24, 25, 26 are simultaneously or separately controlled for aerating or exhausting gas with the pressure valves thereof, the movable frame 22 can be rotated in a one rotational degree of freedom with a frontward-and-backward swinging or a leftward-and-rightward swinging, or the movable frame 22 can be rotated in the two rotational degrees of freedom without mutual interference. Also, when all of the pneumatic bellows 23, 24, 25, 26 are simultaneously controlled for aerating or exhausting gas with the pressure valve thereof, the movable frame 22 can be vertically ascended or descended along a Z-axis perpendicular to the X-axis and Y-axis.

The pneumatic bellows 23, 24, 25, 26 of the motion platform 20 can be optionally substituted by pneumatic cylinders or pneumatic cushions which are having same function with the pneumatic bellows 23, 24, 25, 26 thereof, in which the pneumatic cylinders or pneumatic cushions are configured orthogonally on the top surface of the base chassis 21, and the movable frame 22 is assembled on the pneumatic cylinders or pneumatic cushions so as to allow operating in two rotational degrees of freedom.

Figure 4:
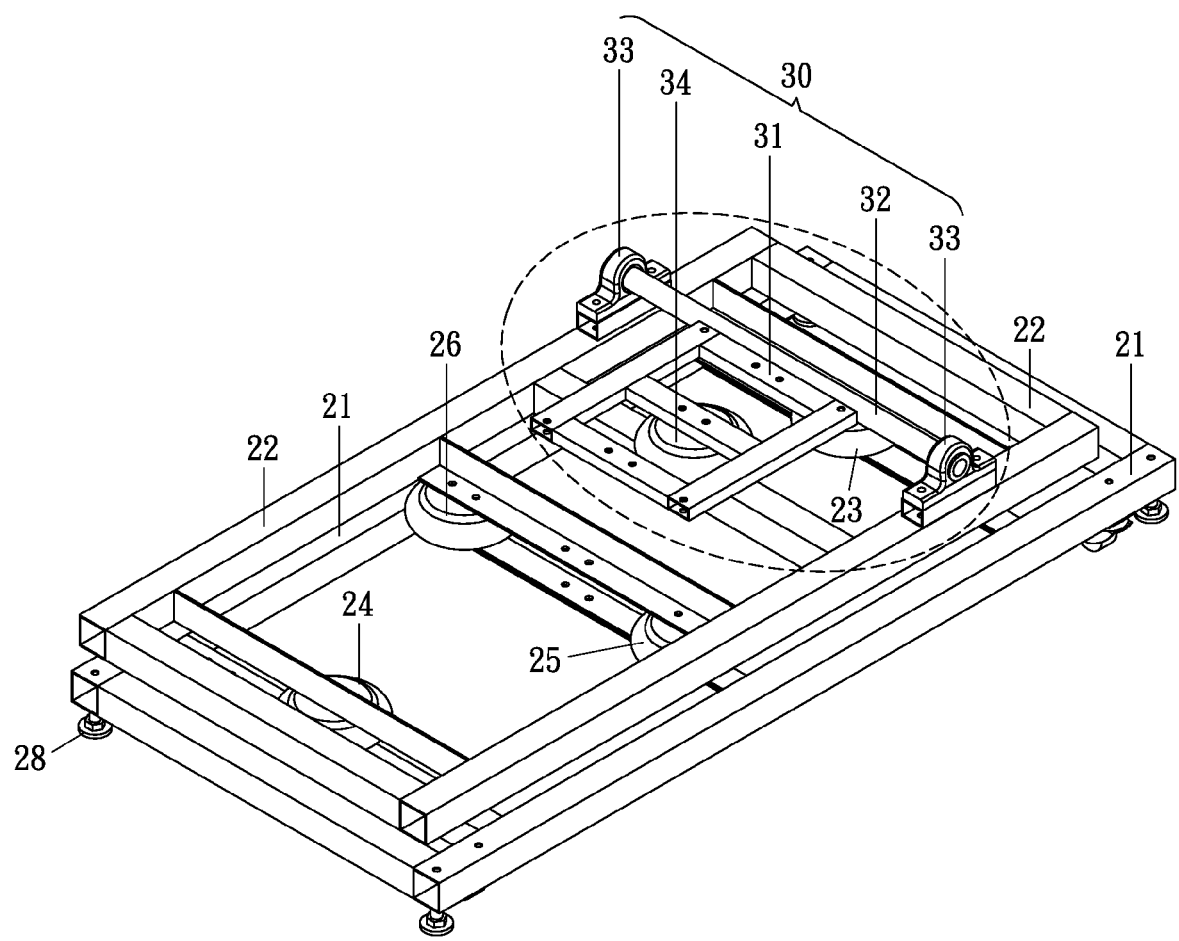
FIG. 4 is a perspective view of a motion platform having decoupled two axes according to another embodiment of the present disclosure.

Reference is now made to FIG. 4. In another embodiment of the present disclosure, besides the base chassis 21, the movable frame 22 and the pneumatic bellows 23, 24, 25, 26 of the motion platform 20, the motion platform 20 of the present disclosure further includes a seat assembly 30 disposed on a top surface of the movable frame 22. Since the base chassis 21, the movable frame 22 and the pneumatic bellows 23, 24, 25, 26 are similar to the aforementioned descriptions in the embodiment of FIGS. 2 and 3, thus, no longer introduction again.

The seat assembly 30 comprises a swinging frame 31, a second pneumatically-driven element (e.g. an independent pneumatic bellow 34) independently installed relative to the pneumatic bellows 23, 24, 25, 26, and a pair of bearings 33 separately disposed on the top surface of the movable frame 22.

The swinging frame 31 is made of a framework with firm and rigid properties, and uses a pivot shaft 32 engaging with the bearings 33 to become a hinge assembly. The independent pneumatic bellow 34 is disposed between the top surface of the movable frame 22 and the swinging frame 31 of the seat assembly 30, so that, by operating the hinge assembly, the swinging frame 31 is capable of operating in one rotational degree of freedom. The independent pneumatic bellow 34 can be substituted by a pneumatic cylinder or a pneumatic cushion having same function with the independent pneumatic bellow 34.

The aforementioned independent pneumatic bellow 34 is connected to the gas compressor (not shown in Figures) via a pipeline having a pressure valve thereon, and the pressure valve on the pipeline of the independent pneumatic bellow 34 can be controlled as a switch to aerate or exhaust gas for increasing or decreasing gas-pressure in the independent pneumatic bellow 34 by computer software programs. Thus, when the pressure valve on the pipeline of the independent pneumatic bellow 34 is controlled to aerate or exhaust gas, the gas compressor makes the independent pneumatic bellow 34 inflating or shrinking so that the swinging frame 31 is allowed operating in another one rotational degree of freedom with a frontward-and-backward swinging around the pivot shaft 32 so as to further provide a strongly dynamic effect for traveling downward or upward.

Figure 5:
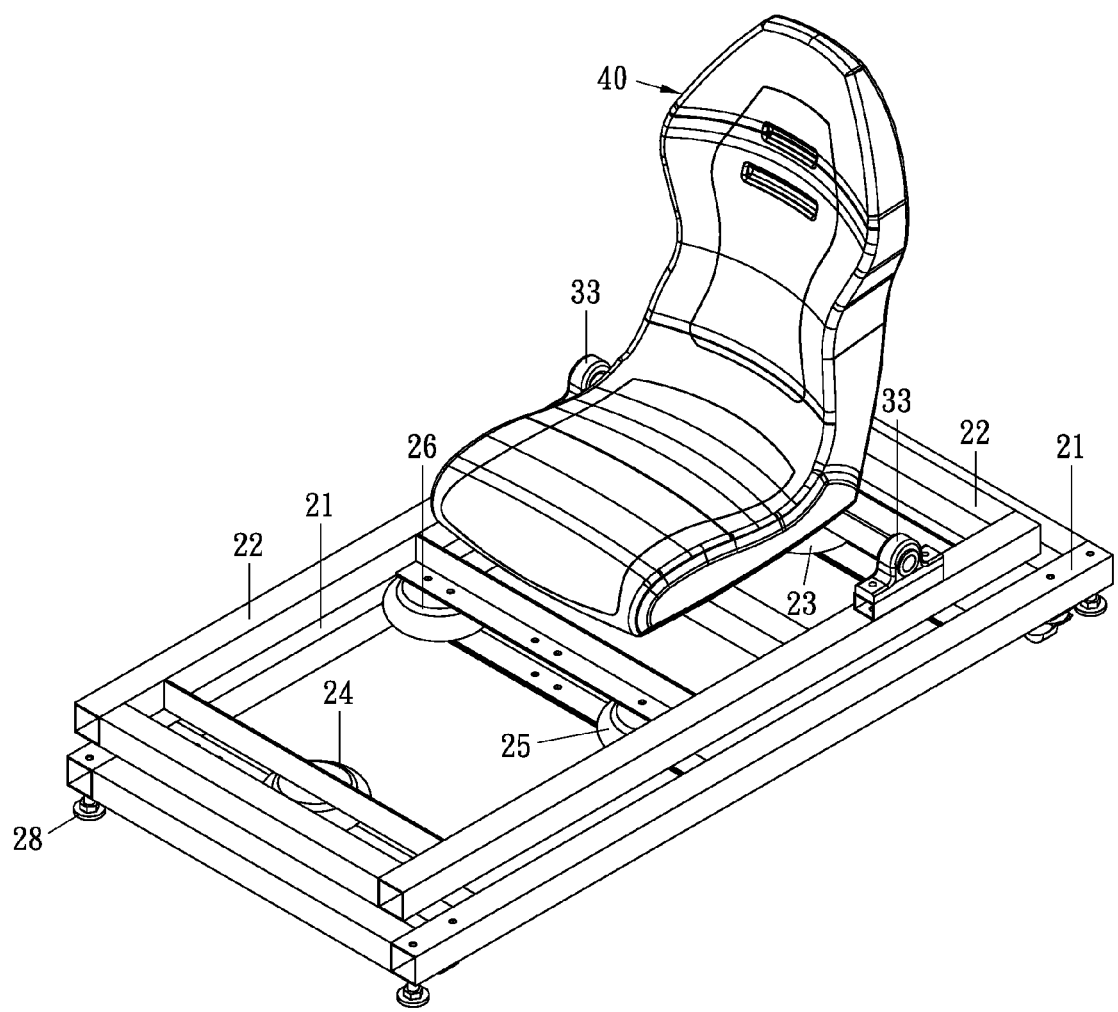
FIG. 5 is a perspective view of a game console platform assembled by the motion platform having decoupled two axes of FIG. 4 and an audience seat.

Reference is now made to FIG. 5. In FIG. 5, a top surface of the swinging frame 31 can be further configured with an audience seat 40 thereon for user(s) or player(s). When a user or a player sits on the audience seat 40, the user or the player can be carried by the audience seat 40 to experience the two rotational degrees of freedom. Furthermore, after the two rotational degrees of freedom are operated, by operating the independent pneumatic bellow 34 of the seat assembly 30 to inflate or shrink, the user or the player also can have more impressive dynamic scene experience for traveling downward or upward from the swinging frame 31.

The motion platform 20 of the present disclosure has advantages of simplification of structural design, reduction of essential components, convenience of maintenance, and decreasing of manufacturing cost, so as to be a motion platform applied to motion games, motion theaters and related virtual reality activities.

It is noted that even through the motion platform of present disclosure is called a motion platform (i.e., having decoupled two axes), the motion platform of present disclosure in fact is a motion platform with three degrees of freedom (DOF) in which the motion platform has a decoupled two-axis rotating around an X-axis, a Y-axis, and the X-axis and the Y-axis, and another axis ascending or descending along a Z-axis. Furthermore, since the movable frame 22 can ascend or descend along a Z-axis, the motion platform of present disclosure is free of a pivot assembly disposed between the base chassis 21 and the movable frame 22.

Although the present disclosure has been described with reference to the preferred embodiments thereof, it is apparent to those skilled in the art that a variety of modifications and changes may be made without departing from the scope of the present disclosure which is intended to be defined by the appended claims.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A motion platform having decoupled two axes, comprising:
    a base chassis configured for being disposed on a ground base;
    a movable frame; and
    four first pneumatically-driven elements securely sandwiched between the base chassis and the movable frame, and each of the four first pneumatically-driven elements is respectively located at a middle of each side of a top surface of the base chassis, and one imagined linear line linking two of the first pneumatically-driven elements is orthogonal to another imagined linear line linking the other two of the first pneumatically-driven elements such that the movable frame is capable of rotating in two rotational degrees of freedom.

2. The motion platform having decoupled two axes according to claim 1, wherein four height-adjustment stands are respectively disposed on four corners of a bottom surface of the base chassis.

3. The motion platform having decoupled two axes according to claim 1, wherein the first pneumatically-driven elements are pneumatic bellows, pneumatic cylinders or pneumatic cushions.

4. The motion platform having decoupled two axes according to claim 3, wherein four height-adjustment stands are respectively disposed on four corners of a bottom surface of the base chassis.

5. The motion platform having decoupled two axes according to claim 1, further comprising a seat assembly disposed on a top surface of the movable frame, and the seat assembly comprises:
    a swinging frame assembled to the movable frame to form a hinge assembly; and
    a second pneumatically-driven element independently installed relative to the first pneumatically-driven elements, and disposed between the top surface of the movable frame and the swinging frame, so that the swinging frame is capable of rotating in one rotational degree of freedom.

6. The motion platform having decoupled two axes according to claim 5, wherein one audience seat is disposed on a top surface of the swinging frame.

7. The motion platform having decoupled two axes according to claim 5, wherein the second pneumatically-driven element is a pneumatic bellow, a pneumatic cylinder or a pneumatic cushion.

8. The motion platform having decoupled two axes according to claim 7, wherein one audience seat is disposed on a top surface of the swinging frame.

9. The motion platform having decoupled two axes according to claim 5, wherein four height-adjustment stands are respectively disposed on four corners of a bottom surface of the base chassis.

10. The motion platform having decoupled two axes according to claim 9, wherein one audience seat is disposed on a top surface of the swinging frame.

* * * * *